April 7, 1964  L. ALAMPRESE  3,127,909
ROTARY GATE VALVE
Filed July 18, 1962
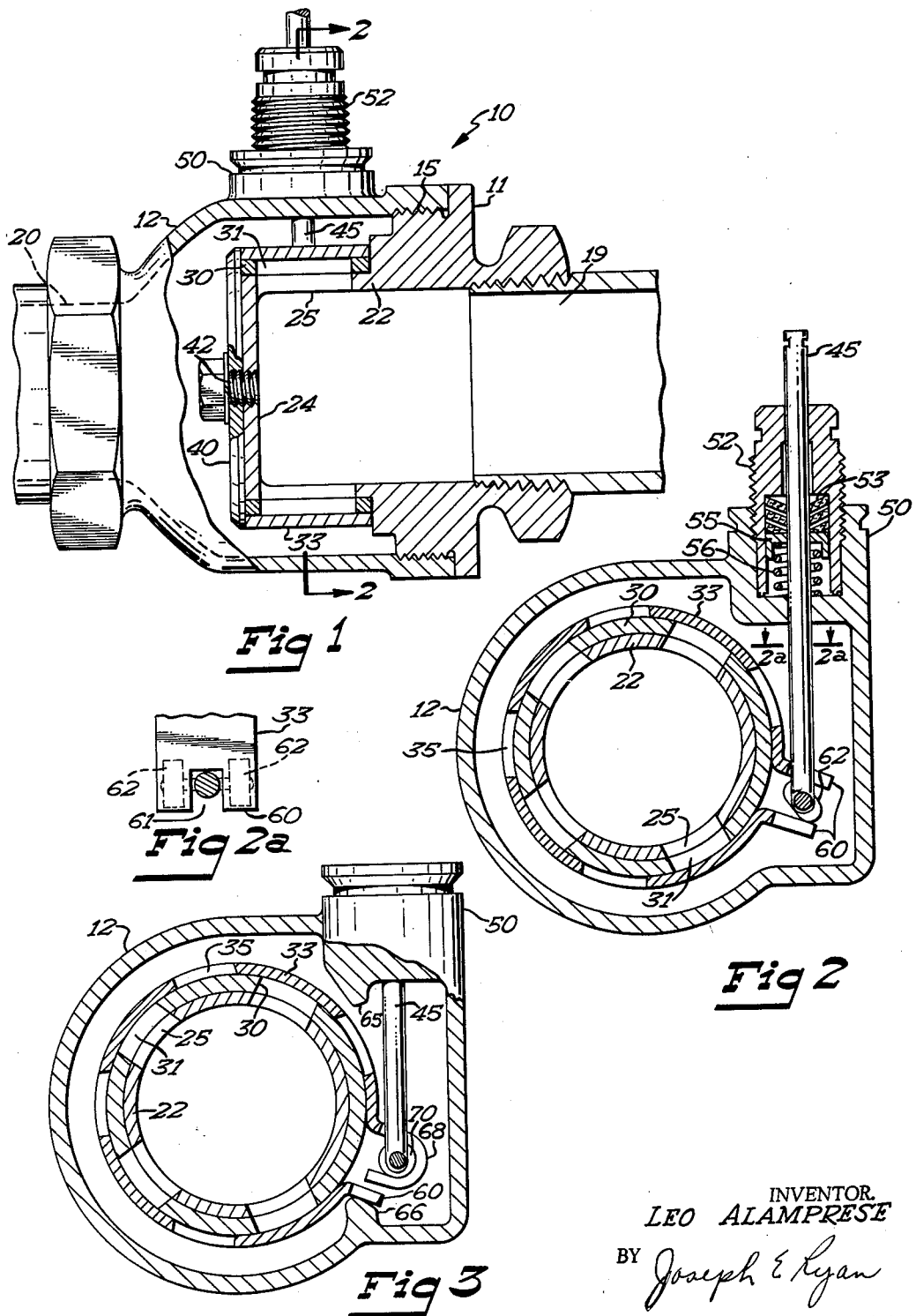
INVENTOR.
LEO ALAMPRESE
BY Joseph E Ryan
ATTORNEY

United States Patent Office 3,127,909
Patented Apr. 7, 1964

3,127,909
ROTARY GATE VALVE
Leo Alamprese, Elmhurst, Ill., assignor to Minneapolis-Honeywell Regulator Company, Minneapolis, Minn., a corporation of Delaware
Filed July 18, 1962, Ser. No. 210,740
12 Claims. (Cl. 137—625.31)

This invention relates to an improved rotary type gate valve and more particularly to an improved valve of this type which requires a low operating force for providing high constant sealing forces and reduced frictional forces therein.

While gate valves of the rotary type are well recognized, the present invention is directed to an improved rotary type gate valve design in which the gate or rotary valve closure member is in the form of a band slidably mounted on the valve seat which is constructed as a tubular member with ports therein, and cooperates with an operating member to provide an arrangement in which the band or gate has its normal clamping pressure released in the valve opening direction and tightened or increased in the valve closed position to provide for ease in moving the valve parts for operating purposes and increasing the close off or sealing pressure when the valve is closed. The valve may also be connected from direct to reverse action by reversing the position of the band or gate on the valve seat. Therefore it is an object of this invention to provide an improved rotary gate type valve. Another object of this invention is to provide in a rotary gate valve means to reduce friction and permit low operating force requirements. Still another object of this invention is to provide a rotary gate type valve with means for increasing close off or sealing pressure. A still further object of this invention is to provide a rotary gate type valve which may be made reverse or direct acting by a reversal of parts, is simple in design and economical to manufacture and maintain. These and other objects of this invention will become apparent from a reading of the attached description together with the drawings wherein:

FIGURE 1 is a sectional view of the valve in elevation disclosing the arrangement of parts, FIGURE 2 is an end view of the valve in FIGURE 1 in section, FIGURE 2a is a portion of the valve of FIGURE 2 in section, and FIGURE 3 is a sectional view of another embodiment of the valve.

In FIGURE 1, the improved rotary type gate valve is shown in the form of and similar to a modified type globe valve including generally a casing or valve body means 10 and is comprised of a pair of casing parts 11 and 12. These casing parts are designed to be fitted together and connected by means of a threaded connection indicated generally at 15 which, although not shown, would obviously include a suitable sealing means. Each of the parts 11 and 12 includes standard flow openings or inlet and outlet passages indicated at 19 and 20 which are threaded in a conventional manner and designed to receive piping conduits. It will be recognized that the function of these passages may be interchanged such that flow through the valve may be reversed if desired.

The inlet casing part includes a tubular section 22 extending from the flow opening 19 or aperture and in communication therewith. The tubular section 22 extends into the confines of the casing part 12 when the valve casing parts 11 and 12 are assembled and the tubular section is closed by means of an integral end wall 24 except for a plurality of ports 25 positioned around the periphery of the tubular section within the casing parts or casing 10 when assembled. These ports extend generally in a radial direction and are equally spaced about the periphery having the same circumferential dimension in the tubular section 22. Positioned over the exposed periphery of the tubular member 22 with the ports 25 therein is a band of low friction material 30 which band is suitably secured to the periphery of the tubular section 22 such as to be stationary therewith. The band of low friction material may be bonded on or otherwise secured to the tubular section and it contains ports 31 aligned with and having the same dimensions as the ports 25 in the tubular section. The low friction material 30 on the tubular section 22 defines basically the valve seat for this improved rotary gate type valve and, depending upon the materials employed, the low friction material may or may not be included. Cooperating with this valve seat is a valve closure member in the form of a cylindrical band or gate 33 which is positioned to overlie the peripheral surface of the tubular member 22 and is flexible and formed with tension or set in a direction to grip the surface of the tubular member. The band 33 also has spaced ports or apertures therein indicated at 35 (best seen in FIGURES 2 and 3) which apertures or ports are shaped similar to those in the low friction material 30 and tubular member 22 and similarly spaced so that for predetermined positions of the band 33 relative to the tubular member 22, the ports therein align to provide a flow passage from the flow opening 19 through the tubular section and ports 25 and 33 to the interior of the valve casing 10 which communicates with the flow opening 20 in the other valve casing member 12. The band 33 is designed to be rotatably positioned on the tubular member 22 in a sliding type motion and the low friction material 30 or the surface on the tubular member 22 is designed to reduce friction and provide low force requirements in this sliding rotative type movement. Normal operating position for the valve is the alignment of the ports in the band and tubular member to provide a valve open condition with a valve closed condition being defined by disalignment of the ports 35 with the ports 25 within the tubular member. These conditions occur at or near the extremes of relative movement of the band or gate on the tubular member. They may be reversed, that is the valve may be made reverse or direct acting relative to associated actuator (not shown) movement, by reversing the position of the band on the tubular member because of the symmetrical location or spacing of the ports and openings therein. A circular disc or retaining member 40 may be secured to the end wall 24 of the tubular section through suitable screw means 42 to retain the band 33 in position on the tubular member 22, if desired.

The band or valve closure member may take several forms from the standpoint of connection to the operating shaft, indicated at 45, and these forms or embodiments are shown in detail in FIGURES 2 and 3. The operating shaft 45 extends through a hub 50 on the casing part 12, which hub includes a sealing washer assembly including a threaded retaining section 52 and a plurality of disc or cone-shaped sealing washers 53 positioned therein surrounding the shaft 45. These cone-shaped washers are urged against the shaft for sealing purposes through a thrust member 55 which is biased by means of a spring 56 located in the flange or hub section 50 and encircling the shaft 45.

In FIGURE 2 the embodiment of the band 33 is provided with a pair of parallel extremities 60 which extend translationally from the axis of the tubular member and the main portion of the cylindrical band 33. These extremities 60 will also be seen in FIGURE 2a together with slots 61 therein which permit passage of shaft 45 therethrough. Slots 61 are included in both extremities so that the band may be turned over on the tubular member if it is desired to reverse the operation of the valve with respect to an associated actuator. These extremities are designed to engage a cam or spool 62 attached to the extremity of the rod 45. As will be noted in FIGURE 2, the flange section 50 and hence the operating shaft 45 is offset from the axis of the tubular section and hence of the valve, and the operating shaft 45 is designed to be moved up and down or into and out of the casing 10 to impart rotation or sliding movement to the band 35 on the tubular section 22. The band, as previously indicated, is formed in a flexible material which has a set or bias such that it encloses the tubular section 22 with the extremities 60 of the band being spaced apart slightly wider than the width of the cam 62 on the operating shaft 45. This spool or cam 62, when moved in the upward direction of movement, as seen in FIGURE 2, will impart a sliding rotation or movement to the band 33 in a counter-clockwise direction tending to spread the band against its normal bias, releasing the clamping force thereon to reduce the force required to rotate the band on the tubular section. As such the cam 62 performs a camming action tending to reduce the frictional forces in the opening direction of the valve and the shaft 45 may be withdrawn from the valve casing 10 through the flange sections 50 until the ports 35 in the band 33 will align with the ports 25 in the tubular member 22 and the ports in the low friction material 30. This is the full open position of the valve and flow will be directed in one direction or the other through the flow openings 19 and 20 and the interior of the valve casing 10. Thus as the fixed spool or cam 62 on the stem or shaft rises, it wedges the gate or band 33 open, creating clearance over the seat and permitting free rotation of the same on the tubular member or seat 22. The normal bias of the band when the lug and shaft are moved in the opposite direction will be such that the clearance between the lug 62 and the extremities 60 in the closed direction will permit the bias or set on band 22 to provide positive closing action. However upon movement from the open position toward the closed position, the lower surface of the cam 62, when engaging the lower extremity 60 of the band or gate, will again spring the band to allow free rotation of the band on the tubular section or seat 22 for closing movement. Thus a low friction, low force valve is provided with positive close off action.

The embodiment shown in FIGURE 3 utilizes a different type of extremity on the band or gate 33 and provides slightly different means for insuring positive close off. In this embodiment, the valve casing part 12 includes a pair of lugs or stops 65 and 66 therein which are designed to be engaged by the extremities or ends of the band 33 for reverse or direct acting type of operation. While extremity 60 with slot 61 of gate 33 remains unchanged, the other extremity of the gate or band indicated at 68 is hooked or curved in form and includes a slot 69. The tubular section 22 with the ports 25 therein, the band of low friction material, and the ports 35 in the band or gate 33 remain unchanged. The operating shaft 45 in this embodiment includes a roller 70 journalled on the extremity of the same and positioned through slot 69 and within the hook 68 of the band 33. In this embodiment the band may or may not be sprung on tubular member 22. Slight clearance is still provided between the hook 68 and the roller or cam 70 so that upon upward or opening movement of the shaft 45, the band will be spread on the tubular section 22 to overcome gripping pressure of the band, if it is present to reduce the frictional force between the band 33 and the low friction material 30 on the tubular member 22 in the opening direction as the ports 35 and 25 respectively in these parts are brought into alignment for opening movement of the valve. In the closing direction, as the operating shaft is moved into the confines of the casing 10, the hook will engage the roller 70 to cause sliding rotative of the band 33 on the tubular member. As the extremity 60 of band 33 engages the lug 66 in the closing position, tension will be applied to the band, causing it to grip the surface of the tubular member for positive close off action. The stop 65 is included on the casing member part 12 to permit this action when the band is reversed on member 22 and movement of the operating shaft is in the opposite direction for the valve closing condition.

In this embodiment, the roller 70 on the end of the shaft 45 is designed to move thereon to provide reduction in friction between these parts as the valve is moved between opening and closing positions.

Thus in the embodiments of FIGURES 2 and 3, the cam 62 or roller 70 on the shaft 45 will, upon movement of the shaft to the valve closed position, permit clamping the band or gate 33 on the tubular member in the down position. In one instance, this is due to the clearance between these parts, while in the latter embodiment it is due to positive clamping action. In the opposite direction of shaft motion, the relative position between the extremities of the band 33 and the cam 62 will be such as to spread the band against the bias permitting free rotative movement of the band on the tubular member 22. This may also be true for the action of roller 70 if the band associated therewith is sprung or biased on the tubular member. The use of the low friction material or sleeve on the tubular member 22 permits a reduction of the friction between these parts.

In considering this invention it should be remembered that the present disclosure is intended to be illustrative only, and the scope of the invention should be determined only by the appended claims.

I claim:

1. A rotary type gate valve comprising, a two-part valve casing means each part having a threaded flow opening therein, one of said valve casing means including a tubular ported member connected with the threaded flow opening and adapted to be positioned within the other of said valve casing means when said two-part valve casing means is assembled, a ported sleeve of low friction material positioned over the exposed tubular ported member within said casing means, said ports in said sleeve aligning with the ports in said tubular member, a split slideable band type gate member having a pair of extremities positioned over said sleeve and having ports therein spaced to align with the ports in said sleeve and said tubular member, means on said tubular member retaining said gate member in sliding relationship on said sleeve, an operating shaft extending through and movably sealed in the other of said valve casing means and displaced from the axis of said gate member and tubular ported member, cam means positioned on the end of said shaft and engaging the extremities of said gate member so that movement of said shaft into and out of said casing means will cause sliding rotative movement of said gate member on said sleeve to move the ports in said gate member into and out of alignment with the ports in said tubular member, said cam means on said shaft causing a spreading action on said gate member with a sliding movement in the direction toward aligning said ports in said gate and tubular members and permitting a clamping action of said gate member on said tubular member after movement of said gate member in a direction causing said ports in said gate member to move out of alignment with the ports in said tubular member.

2. A rotary type gate valve comprising, a two-part valve casing means each part having a threaded flow opening therein, one of said valve casing means including a tubular ported member connected with the threaded flow opening and adapted to be positioned within the other of said valve casing means when said two-part valve casing means is assembled, friction reducing means positioned on said tubular ported member, a split slideable band type gate member having translationally extending extremities positioned over said tubular member and having ports therein adapted to align with the ports in said tubular member, means on said tubular member for retaining said gate member thereon in sliding relationship, a shaft including means positioned on the end of said shaft and engaging the extremities of said gate member so that movement of said shaft into and out of said casing means will cause sliding movement of said gate member on said tubular member to move the ports in said gate member into and out of alignment with the ports in said tubular member, said means on said shaft causing a spreading action on said gate member with a sliding movement in the direction toward aligning said ports in said gate and tubular members and a clamping action of said gate member on said tubular member after movement of said gate member in a direction causing said ports in said gate member to move out of alignment with the ports in said tubular member.

3. A rotary type gate valve comprising, a two-part valve casing means each part having a flow opening therein, one of said valve casing means including a tubular ported member connected with the flow opening and adapted to be positioned within the other of said valve casing means when said two-part valve casing means is assembled, the ports in said tubular member being spaced about the circumference thereof, an expandable and slideable band type gate member having transversely extending operating means positioned over said tubular member and having ports therein spaced to align with the ports in said tubular member, an operating shaft extending through and movably sealed in the other of said valve casing means and displaced from the axes of said gate member and tubular ported member, cam means positioned on the end of said shaft and engaging said operating means of said gate member so that movement of said shaft into and out of said casing means will cause sliding rotative movement of said gate member on said tubular member to move the ports in said gate member into and out of alignment with the ports in said tubular member, the cam on said shaft engaging said operating means of said gate member in such a manner as to reduce friction in rotative movement of said cam for the direction of rotative movement causing alignment between the ports on said gate member and said tubular member and positive close off when said ports on said tubular and gate members are out of alignment.

4. A rotary type gate valve comprising, a two-part valve casing means each part having a flow opening therein, one of said valve casing means including a tubular ported member connected with the flow opening and adapted to be positioned within the other of said valve casing means when said two-part valve casing means is assembled, a slideable band type gate member having an offset portion positioned over said tubular member with said offset portion out of engagement with said tubular member and having ports therein spaced to align with the ports in said tubular member, means on said tubular member reducing friction between said tubular member and said gate member, an operating shaft extending through and movable in the other of said valve casing means, means positioned on said shaft and engaging said gate member such that movement of said shaft into and out of said casing means will cause sliding rotative movement of said gate member on said tubular member to cause the ports on said gate member to align with the ports on the tubular member, said means on said shaft cooperating with said offset portion to reduce friction between these members with sliding movement in the direction of alignment of ports in the members and in the opposite direction of sliding movement and to permit increasing of the pressure of said gate member on said tubular member in a position of disalignment of the ports in said members.

5. A rotary type gate valve comprising, a two-part valve casing means each part having a flow opening therein, one of said valve casing means including a tubular ported member connected with the flow opening and adapted to be positioned within the other of said valve casing means when said two-part valve casing means is assembled, an expandable and slideable band type gate member positioned over said tubular member and having ports therein spaced to align with the ports in said tubular member, an operating shaft extending through and movable in the other of said valve casing means, means positioned on said shaft and engaging said gate member such that movement of said shaft into and out of said casing means will cause sliding rotative movement of said gate member on said tubular member to cause the ports on said gate member to align with the ports on the tubular member, said means on said shaft cooperating with said gate member to reduce friction between these members with sliding movement in the direction of alignment of ports in the members and in the opposite direction of sliding movement and to permit increasing of the pressure of said gate member on said tubular member in a position of disalignment of the ports in said members.

6. A rotary type gate valve comprising, a two-part valve casing means each part having a flow opening therein, one of said valve casing means including a tubular ported member connected with the flow opening and adapted to be positioned within the other of said valve casing means when said two-part valve casing means is assembled, an expandable and slideable band type gate member positioned over said tubular member and having ports therein spaced to align with the ports in said tubular member, operating means included in said casing means and movable therein being adapted to engage said gate member to rotate said gate member on said tubular member, and means included in said operating means for spreading said band type gate member on said tubular member for one direction of movement of said operating means causing slideable rotative movement of said gate member and clamping said gate member on said tubular member for an opposite position of said operating means and said gate member as said ports in said gate member and said tubular member are brought into and out of alignment.

7. A rotary type gate valve comprising, a two-part valve casing means each part having a flow opening therein, one of said valve casing means including a tubular ported member connected with the flow opening and adapted to be positioned within the other of said valve casing means when said two-part valve casing means is assembled, a ported sleeve of low friction material positioned over the exposed tubular ported member within said casing means, said ports in said sleeve aligning with the ports in said tubular member, a split slideable band type gate member having a pair of extremities positioned over and biased on said sleeve and having ports therein spaced to align with the ports in said sleeve and said tubular member, means on said tubular member retaining said gate member in sliding relationship on said sleeve, an operating shaft extending through and movably sealed in the other of said valve casing means and displaced from the axes of said gate member and tubular ported member, means positioned on the end of said shaft and engaging the extremities of said gate member so that movement of said shaft into and out of said casing means will cause sliding rotative movement of said gate member on said sleeve to move the ports in said gate member into and out of alignment with the ports in said tubular member, said means on said shaft cooperating with said gate member and stop means on said casing means causing a spreading action on said gate member with a sliding movement in the direction toward aligning said ports in said gate and tubular members and a clamping action of said gate member on said tubular member after movement of said gate member in a direction causing said ports in said gate member to move out of alignment with the ports in said tubular member.

8. A rotary type gate valve comprising, a two-part valve casing means each part having a flow opening therein, one of said valve casing means including a tubular ported member connected with the flow opening and adapted to be positioned within the other of said valve casing means when said two-part valve casing means is assembled, friction reducing means positioned on said tubular ported member, a split slideable band type gate member having translationally extending extremities positioned over said tubular member and having ports therein adapted to align with the ports in said tubular member, a shaft including means positioned on the end of said shaft and engaging the extremities of said gate member so that movement of said shaft into and out of said casing means will cause sliding movement of said gate member on said tubular member to move the ports in said gate member into and out of alignment with the ports in said tubular member, said means on said shaft causing a spreading action on said gate member with a sliding movement in the direction toward aligning said ports in said gate and tubular members.

9. A rotary type gate valve comprising, a two-part valve casing means each part having a flow opening therein, one of said valve casing means including a tubular ported member connected with the flow opening and adapted to be positioned within the other of said valve casing means when said two-part valve casing means is assembled, the ports in said tubular member being spaced about the circumference thereof, a split slidable band type gate member having transversely extending operating means including a pair of offset ends positioned over said tubular member and having ports therein spaced to align with the ports in said tubular member, an operating shaft extending through and movably sealed in the other of said valve casing means and displaced from the axes of said gate member and tubular ported member, means positioned on the end of said shaft and engaging said operating means of said gate member so that movement of said shaft into and out of said casing means will cause sliding rotative movement of said gate member on said tubular member to move the ports in said gate member into and out of alignment with the ports in said tubular member, the means on said shaft engaging said operating means of said gate member in such a manner as to reduce friction in rotative movement of said cam for the direction of rotative movement causing alignment between the ports on said gate member and said tubular member and positive close off when said ports on said tubular member and gate member are out of alignment.

10. A rotary type gate valve comprising, a multiple part valve casing means each part having a flow opening therein, one of said valve casing means including a tubular ported member connected with the flow opening and adapted to be positioned with another of said valve casing means when said multiple part valve casing means is assembled, a split slideable band type gate member positioned over said tubular member and having ports therein spaced to align with the ports in said tubular member, an operating shaft extending through and movable in the other of said valve casing means, means positioned on said shaft and engaging said gate member such that movement of said shaft into and out of said casing means will cause sliding rotative movement of said gate member on said tubular member to cause the ports on said gate member to align with the ports on the tubular member, said means on said shaft cooperating with said gate member to reduce friction between these members with sliding movement in the direction of alignment of ports in the members and in the opposite direction of sliding movement and to permit increasing of the pressure of said gate member on said tubular member in a position of disalignment of the ports in said members.

11. A rotary type gate valve comprising, a two-part valve casing means each part having a flow opening therein, one of said valve casing means including a tubular ported member connected with the flow opening and adapted to be positioned within the other of said valve casing means when said two-part valve casing means is assembled, a split slideable band type gate member positioned over said tubular member and having ports therein spaced to align with the ports in said tubular member, an operating shaft extending through and movable in the other of said valve casing means, means included in part on said shaft and in part on said gate member providing upon movement of said shaft into and out of said casing means sliding rotative movement of said gate member on said tubular member to cause the ports on said gate member to align with the ports on the tubular member, said last named means causing a reduction in friction with sliding movement of said gate member in the direction of alignment of ports in the gate and tubular members and in the opposite direction of sliding movement and to permit increasing of the pressure of said gate member on said tubular member in a position of disalignment of the ports in said members.

12. A rotary type gate valve comprising, a two-part valve casing means each part having a flow opening therein, one of said valve casing means including a tubular ported member connected with the flow opening and adapted to be positioned within the other of said valve casing means when said two-part valve casing means is assembled, a split slideable band type gate member positioned over said tubular member and having ports therein spaced to align with the ports in said tubular member, operating means included in said casing means and movable therein being adapted to engage said gate member to rotate said gate member on said tubular member, and means included in part in said operating means and in part in said casing for spreading said band type gate member on said tubular member for one direction of movement of said operating means causing slidable rotative movement of said gate member and clamping said gate member on said tubular member after the other direction of movement of said operating means and said gate member as said ports in said gate member and said tubular member are brought into and out of alignment.

References Cited in the file of this patent

UNITED STATES PATENTS

| | | |
|---|---|---|
| 519,639 | Matthews | May 8, 1894 |
| 1,532,251 | Lorraine | Apr. 7, 1925 |
| 2,649,275 | Noyes | Aug. 18, 1953 |
| 2,893,429 | Schaffer | July 7, 1959 |

FOREIGN PATENTS

| | | |
|---|---|---|
| 552,496 | Great Britain | Apr. 9, 1943 |